UNITED STATES PATENT OFFICE.

THOMAS STEERS, JR., AND JOHN R. SEDGWICK, OF RICHMOND, VIRGINIA.

IMPROVEMENT IN THE MANUFACTURE OF EXTRACTS FROM SUMAC.

Specification forming part of Letters Patent No. 123,590, dated February 13, 1872.

*To all whom it may concern:*

Be it known that we, THOMAS STEERS, Jr., and JOHN R. SEDGWICK, of the city of Richmond, in the county of Henrico and State of Virginia, have invented a new and valuable Improvement in the Manufacturing of Extract from the Natural Leaf of the Sumac; and we do hereby declare that the following is a full and exact description and operation of the same.

The ingredients used are the natural leaves of the sumac. The leaves are first put in a bulk and leached with a revolving sprinkler, and after remaining fifteen hours in bulk, the water is drawn off and placed in a vacuum-pan, and boiled to the consistency of thick molasses. About one-fourth of the extract is realized from the bulk of leaves—that is, in weight, say, one hundred pounds of leached leaves will make twenty-five pounds of the extract. By this mode of making extract from the natural leaf of the sumac, the expense of grinding the leaves is saved, which is about the same as the original or first cost of the leaves, and the entire expense of grinding is thereby saved. This extract is used for tanning and drying both in this country and in Europe, and is becoming quite an item of trade, and the saving of the expense of grinding the leaves before making the extract is a large item saved to the trade.

We do not claim an extract of sumac, for we are aware such has been made by the old process, first grinding the leaves therefor; but such process is expensive for the reason that the cost of grinding is equal to the first cost of the article.

What we claim as our invention is—

The process of making extract of sumac from the leaf in its natural undivided state, as above set forth.

In testimony that we claim the above we have hereunto subscribed our names in the presence of two witnesses.

THOMAS STEERS, JR.
            JOHN R. SEDGWICK.

Witnesses:
   RO. HOWARD,
   GEO. D. WISE.